US010239257B1

(12) United States Patent
Mantha

(10) Patent No.: US 10,239,257 B1
(45) Date of Patent: Mar. 26, 2019

(54) DEPOSITING PORTIONS OF FIBER-REINFORCED THERMOPLASTIC FILAMENT WHILE ALLEVIATING TORSIONAL FORCES

(71) Applicant: Arevo, Inc., Milpitas, CA (US)

(72) Inventor: Chandrashekar Mantha, Santa Clara, CA (US)

(73) Assignee: Arevo, Inc., Milpitas, CA (US)

( * ) Notice: Subject to any disclaimer, the term of this patent is extended or adjusted under 35 U.S.C. 154(b) by 0 days.

(21) Appl. No.: 16/011,567

(22) Filed: Jun. 18, 2018

Related U.S. Application Data

(62) Division of application No. 15/854,673, filed on Dec. 26, 2017, now Pat. No. 10,046,511.

(51) Int. Cl.
| | |
|---|---|
| *B33Y 10/00* | (2015.01) |
| *B33Y 30/00* | (2015.01) |
| *B29C 64/314* | (2017.01) |
| *B33Y 50/02* | (2015.01) |
| *B33Y 70/00* | (2015.01) |
| *B29C 64/393* | (2017.01) |
| *B29C 64/118* | (2017.01) |

(52) U.S. Cl.
CPC .......... *B29C 64/314* (2017.08); *B29C 64/118* (2017.08); *B29C 64/393* (2017.08); *B33Y 10/00* (2014.12); *B33Y 30/00* (2014.12); *B33Y 50/02* (2014.12); *B33Y 70/00* (2014.12)

(58) Field of Classification Search
CPC ... B29C 64/314; B29C 64/393; B29C 64/118; B33Y 10/00; B33Y 50/02; B33Y 30/00; B33Y 70/00
See application file for complete search history.

(56) References Cited

U.S. PATENT DOCUMENTS

| | | | |
|---|---|---|---|
| 2,648,098 | A | 8/1953 | Edward |
| 4,346,138 | A | 8/1982 | Lefferts |
| 5,904,939 | A | 5/1999 | Friedrichs |
| 8,215,621 | B2 | 7/2012 | Koehler et al. |
| 8,747,098 | B1 | 6/2014 | Johnson |
| 9,770,876 | B2 | 9/2017 | Farmer |
| 9,796,140 | B2 * | 10/2017 | Page ........................ B29C 70/30 |

(Continued)

OTHER PUBLICATIONS

Office action, U.S. Appl. No. 15/854,676, dated Aug. 28, 2018.

(Continued)

*Primary Examiner* — Nahida Sultana
(74) *Attorney, Agent, or Firm* — McGeary Cukor LLC; Kenneth Ottesen; Jason Paul DeMont

(57) ABSTRACT

An apparatus and method for managing bending and other applied forces that are exerted on a filament of thermoplastic with reinforcing fibers in a 3D printing system during the deposition process that is associated with the manufacturing of an object. The quality of the manufactured object is enhanced through a process that comprises i) applying torque to certain portions of the solid filament in a manner that is commensurate with the expected motions of the deposition head while depositing those portions, but only after ii) heating each portion to a sufficient temperature. A heating device and a twisting device act on the filament while it is moving toward the deposition point and while under the control of a controller that is operating according to a computer model of the object being manufactured.

20 Claims, 11 Drawing Sheets

(56) References Cited

U.S. PATENT DOCUMENTS

| | | | |
|---|---|---|---|
| 9,815,268 B2 | 11/2017 | Mark | |
| 10,046,511 B1* | 8/2018 | Mantha | B29C 64/314 |
| 10,076,870 B1* | 9/2018 | August | B29C 64/205 |
| 2002/0096238 A1 | 7/2002 | Miyazaki et al. | |
| 2004/0028874 A1* | 2/2004 | Takemoto | B65H 55/00 |
| | | | 428/98 |
| 2006/0047052 A1 | 3/2006 | Barrera | |
| 2010/0098946 A1* | 4/2010 | Tashiro | B29B 9/14 |
| | | | 428/371 |
| 2010/0285265 A1* | 11/2010 | Shinoda | B29B 11/16 |
| | | | 428/80 |
| 2011/0238083 A1 | 9/2011 | Moll | |
| 2012/0171320 A1 | 7/2012 | Vargo | |
| 2013/0337256 A1 | 12/2013 | Farmer | |
| 2014/0048970 A1 | 2/2014 | Batchelder | |
| 2014/0065908 A1* | 3/2014 | Lee | B29C 70/06 |
| | | | 442/136 |
| 2014/0232035 A1 | 8/2014 | Bheda | |
| 2014/0291886 A1 | 10/2014 | Mark | |
| 2014/0328963 A1* | 11/2014 | Mark | B29C 64/386 |
| | | | 425/143 |
| 2015/0165666 A1 | 6/2015 | Butcher et al. | |
| 2015/0183159 A1 | 7/2015 | Duty et al. | |
| 2015/0283751 A1 | 10/2015 | O'Neil | |
| 2015/0331412 A1 | 11/2015 | Adair | |
| 2015/0352789 A1 | 12/2015 | Haider et al. | |
| 2015/0367576 A1 | 12/2015 | Page | |
| 2016/0053410 A1 | 2/2016 | Sterman | |
| 2016/0075086 A1 | 3/2016 | Stauffer | |
| 2016/0107379 A1 | 4/2016 | Mark | |
| 2016/0114532 A1 | 4/2016 | Schirtzinger et al. | |
| 2016/0136885 A1 | 5/2016 | Nielsen-Cole et al. | |
| 2016/0151833 A1 | 6/2016 | Tsao | |
| 2016/0303802 A1 | 10/2016 | Meshorer | |
| 2016/0311165 A1 | 10/2016 | Mark | |
| 2016/0361879 A1 | 12/2016 | Johnson | |
| 2017/0057167 A1 | 3/2017 | van Tooren | |
| 2017/0120519 A1 | 5/2017 | Mark | |
| 2017/0157828 A1 | 6/2017 | Mandel | |
| 2017/0157831 A1 | 6/2017 | Mandel | |
| 2017/0157851 A1 | 6/2017 | Nardiello et al. | |
| 2017/0173868 A1 | 6/2017 | Mark | |
| 2017/0203507 A1 | 7/2017 | Leavitt | |
| 2017/0259502 A1 | 9/2017 | Chapiro | |
| 2017/0341300 A1* | 11/2017 | Rudolph | B29C 64/386 |
| 2017/0355138 A1 | 12/2017 | Mark | |
| 2017/0361527 A1 | 12/2017 | Saarikoski | |
| 2017/0368768 A1 | 12/2017 | Johnson | |
| 2018/0001585 A1 | 1/2018 | Farmer | |
| 2018/0015674 A1 | 1/2018 | Page | |
| 2018/0022032 A1 | 1/2018 | Mark | |
| 2018/0056391 A1 | 3/2018 | Buller | |
| 2018/0169947 A1 | 6/2018 | Jessen | |

OTHER PUBLICATIONS

U.S. Appl. No. 15/854,673, "Notice of Allowance and Fee(s) Due"; "Notice of Allowability"; "Reasons for Allowance," dated Jul. 13, 2018.

Office action, U.S. Appl. No. 15/854,676, dated Mar. 21, 2018.

Office action (requirement for Election/Restriction), U.S. Appl. No. 15/854,673, dated May 10, 2018.

\* cited by examiner

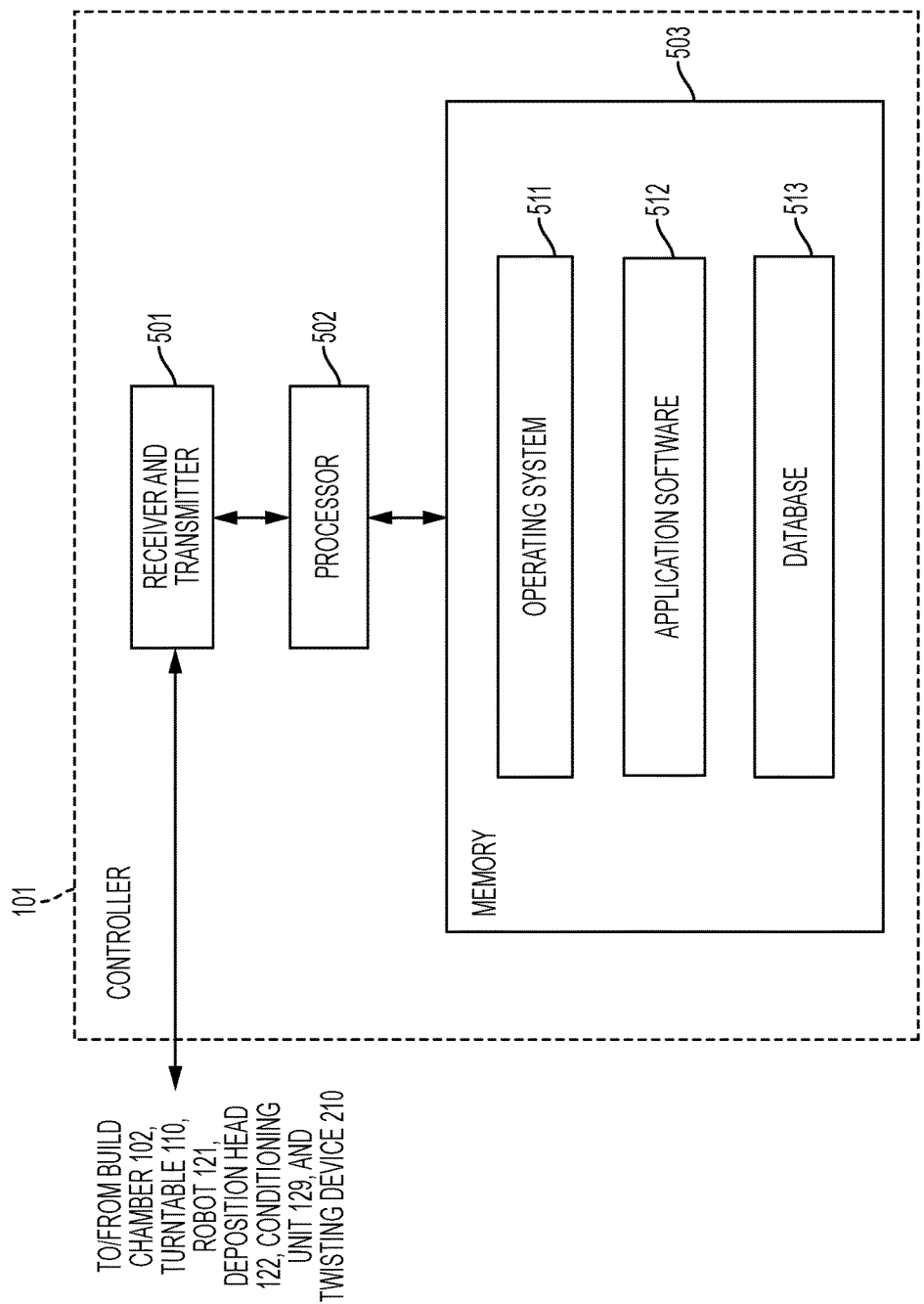

DEPOSITING PORTIONS OF FIBER-REINFORCED THERMOPLASTIC FILAMENT WHILE ALLEVIATING TORSIONAL FORCES

CROSS REFERENCE TO RELATED APPLICATIONS

This application is related to "Depositing Curved Segments of Fiber-Reinforced Thermoplastic Filament," application Ser. No. 15/854,676, which is incorporated by reference herein in its entirety. This application is also related to U.S. application Ser. No. 15/854,673, filed on Dec. 26, 2017, which is incorporated by reference herein in its entirety.

FIELD OF THE INVENTION

The present invention relates to 3D printing in general, and, more particularly, to deposition of a fiber-reinforced thermoplastic filament.

BACKGROUND

In general, there are two complementary approaches to manufacture an object: additive manufacturing and subtractive manufacturing.

Additive manufacturing involves aggregating material to form the desired object. In contrast, subtractive manufacturing involves removing material to form the desired object. In practice, many objects are manufactured using a combination of additive and subtractive techniques.

A form of additive manufacturing—colloquially known as "three-dimensional (3D) printing"—is the subject of intense research and development because it enables objects with complex geometries to be manufactured without molds or dies. Furthermore, 3D printing enables the mass customization of objects with different dimensions and characteristics. There remain, however, many challenges in the design, manufacture, and use of 3D printers.

SUMMARY OF THE DISCLOSURE

The present invention provides a mechanism for depositing arced portions of fiber-reinforced thermoplastic filament without some of the costs and disadvantages for doing so in the prior art.

In accordance with the illustrative embodiment of the present invention, a 3D printing system manufactures an object by depositing one or more segments of fiber-reinforced thermoplastic filament in a prescribed order and geometry.

The thermoplastic filament is approximately cylindrical and comprises a longitudinal axis L. The filament, as manufactured, comprises a plurality of continuous carbon-fibers that are substantially parallel with the longitudinal axis L of the filament.

Thermoplastic filament is manufactured and stored on spools in very long continuous lengths (e.g., hundreds of meters, thousands of meters, tens of thousands of meters, etc.). At the time of printing, the filament is unspooled and cut into distinct segments. The segment has a length s that is measured along the longitudinal axis L.

The filament, as manufactured, is neither pliable nor adhesive at standard pressure and temperature. During deposition, a small portion of a segment of filament is heated to make it pliable and adhesive and then the heated portion is guided and pressed into position where it cools and solidifies.

Each segment, as deposited, comprises:
(i) one or more straight (i.e., rectilinear) portions, or
(ii) one or more non-straight (i.e., curved) portions, or
(iii) any combination of i and ii.

As will be clear to those skilled in the art, every curved portion in two- and three-dimensions can be approximated by a combination of arced portions.

When a portion of a segment of filament is deposited in an arc, the fibers on the "outside" of the arc—which have a high-tensile strength and do not stretch—effectively experience a centripetal force that drags them—and the thermoplastic with which they are impregnated—towards the center of the arc. This inhibits the adhesion of the filament to the underlayment and causes the thermoplastic to form clumps.

The illustrative embodiment alleviates the centripetal force associated with depositing fiber-reinforced thermoplastic filament in arced portions by twisting the filament while it is deposited in an arc. In accordance with the illustrative embodiment, a portion of a segment of filament of length s that is deposited in an arc of $\theta$ radians with a radius R, is twisted $\varphi$ radians around the longitudinal axis L, where:

$$\varphi = 2\pi N \quad \text{(Eq. 1)}$$

where N is a non-zero integer (e.g., +1, −1, etc.) It is worth noting that the amount of twist $\varphi$ is independent of $\theta$ and independent of the radius R, although it will be clear to those skilled in the art, after reading this disclosure, to only twist the filament for arcs in which $\theta$ exceeds a threshold (e.g., $$\frac{\pi}{12}, \frac{\pi}{24}, \frac{\pi}{36},$$

etc.) or the radius R exceeds a threshold (e.g., two times the diameter of the filament, three times the diameter of the filament, etc.) or in which both $\theta$ exceeds a threshold and the radius R exceeds a threshold.

For context, when fibers are not twisted around the longitudinal axis L, $$\frac{d\varphi}{ds} = 0,$$

and when the fibers are twisted around the longitudinal axis L, $$\frac{d\varphi}{ds} \neq 0.$$

In accordance with the illustrative embodiment, the rate of twist in an arced portion of a segment of filament is constant $$\left(i.e., \frac{d^2\varphi}{ds^2} = 0\right).$$

In accordance with the illustrative embodiment, the portion of the filament to be twisted is twisted by an actuator at the deposition head. The twisting of the filament at the deposition head creates torsional forces on both the "downstream" portion of the filament (i.e., the length of filament between the deposition head and the point of deposition) and on the "upstream" portion of the filament (i.e., the length of filament between the deposition head and the spool of filament).

The torsional forces on the downstream filament are desirable because they cause the twisting of the filament which is permanently fixed into the object of manufacture. In contrast, the torsional forces on the upstream filament are reactive and serve no purpose and must be alleviated to prevent the upstream filament from shearing and breaking.

In accordance with the illustrative embodiment, there are three ways of alleviating the torsional forces on the upstream filament.

First, the upstream filament and the spool of filament itself can be twisted $\varphi$ radians around the longitudinal axis L of the upstream filament. It will be clear to those skilled in the art, after reading this disclosure, how to make and use machinery for accomplishing this.

Second, each twist of $+\varphi$ radians in one arced portion of filament can be followed by a twist of $-\varphi$ radians in the next arced portion, and each twist of $-\varphi$ radians in one arced portion of filament could be followed by a twist of $+\varphi$ radians in the next arced portion. If the upstream filament does not break when twisted $\varphi$ radians, then this approach has the advantage of placing a limit on the torsional force. Furthermore, the maximum force can be distributed along a long unspooled length of upstream filament.

Third, a portion of the upstream filament can be heated above the glass transition temperature $T_g$ of the thermoplastic, which allows the thermoplastic molecules to realign themselves in response to the torsional force. This is akin to annealing and has the advantage of eliminating the internal torsional forces in the thermoplastic.

The illustrative embodiment comprises a method of depositing a portion of a segment of fiber-reinforced thermoplastic filament that comprises a longitudinal axis L, the method comprising:

imparting a torsional force to the portion of the segment of fiber-reinforced thermoplastic filament;

heating the portion of the segment of fiber-reinforced thermoplastic filament above a glass transition temperature $T_g$ of the thermoplastic to alleviate the torsional forces;

cooling the portion of the segment of fiber-reinforced thermoplastic filament from above the glass transition temperature $T_g$ of the thermoplastic to below the glass transition temperature $T_g$ of the thermoplastic; and re-heating the portion of the segment of fiber-reinforced thermoplastic filament above the glass transition temperature $T_g$ of the thermoplastic and depositing the portion of the segment of fiber-reinforced thermoplastic filament in a first arc of $\theta_1$ radians and radius $R_1$ while twisting the portion of the segment of fiber-reinforced thermoplastic filament $\varphi_1$ radians around the longitudinal axis L;

wherein $T_g$ and $R_1$ are positive real numbers, and wherein $\theta_1$ and $\varphi_1$ are real numbers.

BRIEF DESCRIPTION OF THE DRAWINGS

FIG. 5 depicts a block diagram of the salient components of controller 101.

DEFINITIONS

Arc—for the purposes of this specification, the term "arc" and its inflected forms is defined as a non-zero part of a circle (i.e., $0<\theta\leq2\pi$).

Curve—for the purposes of this specification, the term "curve" and its inflected forms is defined as a curvilinear path that comprises a plurality of contiguous segments, wherein each segment is:
  i. an arc, or
  ii. a straight line.

Straight line—for the purposes of this specification, the term "straight line" and its inflected forms is defined as a rectilinear path.

DETAILED DESCRIPTION

The techniques of the illustrative embodiment are described in this specification in the context of handling thermoplastic filament comprising fibers, in an additive manufacturing system. As those who are skilled in the art will appreciate after reading this specification, the disclosed techniques can also be used in various other applications, and with either filaments or other slender threadlike objects or fibers.

Furthermore, the techniques of the illustrative embodiment are described in this specification in the context of twisting a portion of the filament in response to a bending of the portion. As those who are skilled in the art will appreciate after reading this specification, the disclosed techniques can also be used for twisting a portion of the filament in response to a different type of force that is applied to the portion than bending, such as tension, compression, shear, or torsion (twisting) that is different from the twisting that is provided in response.

Figure 1:
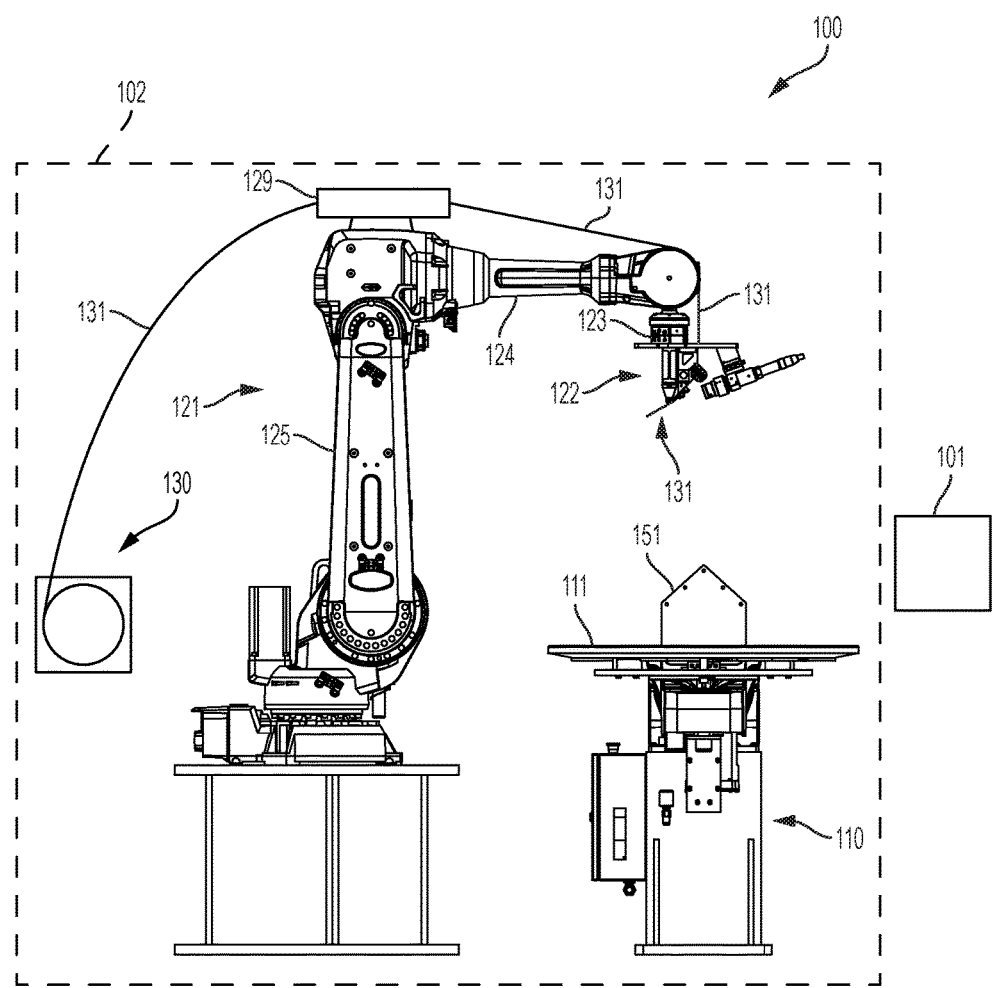
FIG. 1 depicts an illustration of the salient components of additive manufacturing system 100 in accordance with the illustrative embodiment of the present invention.

FIG. 1 depicts an illustration of the salient components of additive manufacturing system 100 in accordance with the illustrative embodiment of the present invention. Additive manufacturing system 100 comprises: controller 101, build chamber 102, turntable 110, deposition build plate 111, robot 121, deposition head 122, filament conditioning unit 129, filament source 130, and thermoplastic filament 131. A purpose of manufacturing system 100 is to manufacture object 151, which can be an article of manufacture or at least part of an apparatus.

Controller 101 comprises the hardware and software necessary to direct build chamber 102, robot 121, deposition head 122, and turntable 110, in order to manufacture object 151. The controller also directs at least some of the components that are part of deposition head 122, as described below. Controller 101 comprises computer-aided design/computer-aide manufacturing (CAD/CAM) functionality in order to control the aforementioned components. Controller 101 is described below and in regard to FIG. 5.

Build chamber 102 is a thermally-insulated, temperature-controlled environment in which object 151 is manufactured. It will be clear to those skilled in art how to make and use build chamber 102.

Turntable 110 comprises a stepper motor under the control of controller 101 that is capable of rotating build plate 111 (and, consequently object 151) around the Z-axis (i.e., orthogonal to the build plate). In particular, turntable 110 is capable of:
  i. rotating build plate 111 clockwise around the Z-axis from any angle to any angle, and
  ii. rotating build plate 111 counter-clockwise around the Z-axis from any angle to any angle, and
  iii. rotating build plate 111 at any rate, and
  iv. maintaining (statically) the position of build plate 111 at any angle.

In some embodiments of the present invention, turntable 110 is further capable of being positioned in general (i.e., not being limited to rotation around the Z-axis), under the control of controller 101, and accordingly is sometimes referred to as a "build plate positioner." It will be clear to those skilled in the art how to make and use turntable 110.

Build plate 111 is a platform comprising hardware on which object 151 is manufactured. Build plate 111 is configured to receive heated filament deposited by deposition head 122.

As those who are skilled in the art will appreciate, build plate 111 need not be coupled to a turntable, in order for it to receive the heated filament. In any event, it will be clear to those skilled in the art how to make and use build plate 111.

Robot 121 is capable of depositing a run of material, via deposition head 122, from any three-dimensional coordinate in build chamber 102 to any other three-dimensional coordinate in build chamber 102 with deposition head 122 at any approach angle. To this end, robot 121 comprises a multi-axis (e.g., six-axis, seven-axis, etc.), mechanical arm that is under the control of controller 101. The mechanical arm comprises first arm segment 123, second arm segment 124, and third arm segment 125. The joints between adjoining arm segments are under the control of controller 101. A non-limiting example of robot 121 is the IRB 4600 robot offered by ABB. It will be clear to those skilled in the art how to make and use robot 121.

The mechanical arm of robot 121 can move roller 204 of deposition head 122, described below and in FIG. 2, in:
  i. the +X direction,
  ii. the −X direction,
  iii. the +Y direction,
  iv. the −Y direction,
  v. the +Z direction,
  vi. the −Z direction, and
  vii. any combination of i, ii, iii, iv, v, and vi,
while rotating the approach angle of the roller around any point or temporal series of points. It will be clear to those skilled in the art how to make and use robot 121.

Deposition head 122 comprises hardware that is under the control of controller 101 and that deposits filament 131, which may partially or wholly contain one or more fiber strands. Deposition head 122 is described below and in regard to FIG. 2. Deposition head 122 is an example of an "end effector" in relation to robot 121, being attached to robot 121 at the robot's wrist.

Filament conditioning unit 129 comprises hardware that is under the control of controller 101 and that conditions filament 131. Unit 129 is attached to robot 121 at arm segment 124. As those who are skilled in the art will appreciate after reading this specification, unit 129 can be attached to a different arm segment, or to something other than robot 121 entirely (e.g., deposition head 122, etc.). Filament conditioning unit 129 is described below and in regard to FIG. 4.

Thermoplastic filament 131 comprises a longitudinal axis L, depicted in FIGS. 7 through 10, and a reinforcing fiber that is substantially parallel to the longitudinal axis. In accordance with the illustrative embodiment, thermoplastic filament 131 comprises a cylindrical towpreg of contiguous 12K carbon fiber that is impregnated with thermoplastic resin and is supplied from filament source 130 (e.g., a spool, etc.). Thermoplastic filament 131 comprises contiguous carbon fiber, but it will be clear to those skilled in the art, after reading this disclosure, how to make and use alternative embodiments of the present invention in which thermoplastic filament 131 has a different fiber composition.

It will be clear to those skilled in the art, after reading this disclosure, how to make and use alternative embodiments of the present invention in which filament 131 comprises a different number of fibers (e.g., 1K, 3K, 6K, 24K, etc.). It will be clear to those skilled in the art, after reading this disclosure, how to make and use alternative embodiments of the present invention in which the fibers in filament 131 are made of a different material (e.g., fiberglass, aramid, carbon nanotubes, etc.).

In accordance with the illustrative embodiment, the thermoplastic is, in general, a semi-crystalline polymer and, in particular, the polyaryletherketone (PAEK) known as polyetherketone (PEK). In accordance with some alternative embodiments of the present invention, the semi-crystalline material is the polyaryletherketone (PAEK), polyetheretherketone (PEEK), polyetherketoneketone (PEKK), polyetheretherketoneketone (PEEKK), or polyetherketoneetherketoneketone (PEKEKK). As those who are skilled in the art will appreciate after reading this specification, the disclosed annealing process, as it pertains to a semi-crystalline polymer in general, takes place at a temperature that is above the glass transition temperature $T_g$.

In accordance with some alternative embodiments of the present invention, the semi-crystalline polymer is not a polyaryletherketone (PAEK) but another semi-crystalline thermoplastic (e.g., polyamide (PA), polybutylene terephthalate (PBT), poly(p-phenylene sulfide) (PPS), etc.) or a mixture of a semi-crystalline polymer and an amorphous polymer.

When the filament comprises a blend of an amorphous polymer with a semi-crystalline polymer, the semi-crystalline polymer can one of the aforementioned materials and the amorphous polymer can be a polyarylsulfone, such as polysulfone (PSU), polyethersulfone (PESU), polyphenylsulfone (PPSU), polyethersulfone (PES), or polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), or polycarbonate (PC). As those who are skilled in the art will appreciate after reading this specification, the disclosed annealing process, as it pertains to a blend of an amorphous polymer with a semi-crystalline polymer, takes place generally at a lower temperature than a semi-crystalline polymer with the same glass transition temperature; in some cases, the annealing process can take place at a temperature slightly below the glass transition temperature.

When the filament comprises a blend of an amorphous polymer with a semi-crystalline polymer, the weight ratio of semi-crystalline material to amorphous material can be in the range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application may vary primarily as a function of the materials used and the properties desired for the printed object.

In some alternative embodiment of the present invention, the filament comprises a metal. For example, and without limitation, the filament can be a wire comprising stainless steel, Inconel® (nickel/chrome), titanium, aluminum, cobalt chrome, copper, bronze, iron, precious metals (e.g., platinum, gold, silver, etc.).

Thermoplastic filament 131 is deposited as a "run of material" onto object 151 or build plate 111, or both. For purposes of clarity, however, filament 131 is depicted in FIG. 1 as being not in contact with object 151. The particular shape of object 151 as depicted has been selected for pedagogical purposes, but additive manufacturing system 100 is capable of building any of a variety of objects.

Figure 2:
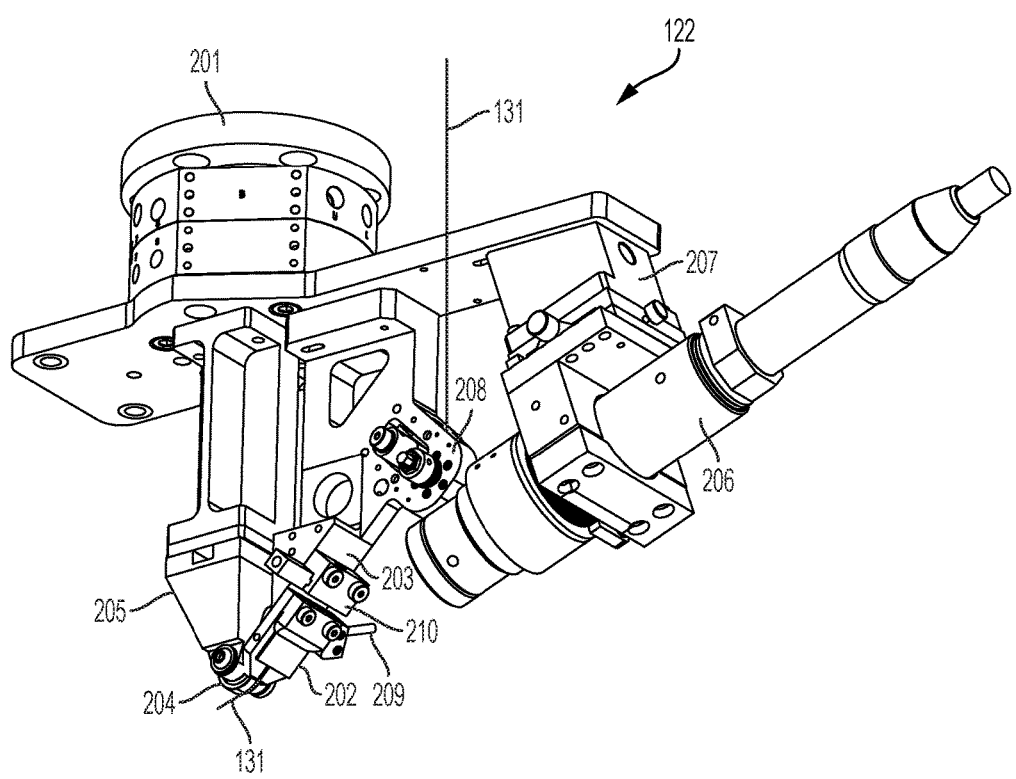
FIG. 2 depicts an illustration of deposition head 122, which includes twisting device 210.

FIG. 2 depicts an illustration of deposition head 122. Deposition head 122 comprises: mount 201, filament guide 202, filament guide support 203, roller 204, deposition head body 205, laser 206, laser support 207, filament drive 208, conduit 209, and twisting device 210, interconnected as shown. As those who are skilled in the art will appreciate after reading this specification, one or more of the elements that are depicted as being part of deposition head 122 can instead be part of robot 121 or a different part of additive manufacturing system 100.

In accordance with the illustrative embodiment, the relative spatial positions of mount 201, filament guide 202, support 203, roller 204, deposition head body 205, laser 206, support 207, filament drive 208, and twisting device 210 are invariant, but it will be clear to those skilled in the art, after reading this disclosure, in which the relative spatial positions of two or more of them is not invariant.

Mount 201 of deposition head 122 comprises one or more parts that are configured to mount the other components of deposition head 122 to the arm of robot 121.

Filament guide 202 is configured to guide filament 131, toward a deposition surface at a deposition point, in accordance with the illustrative embodiment. In some embodiments of the present invention, at least a portion of filament guide 202 is transparent—or substantially transparent—to the light from laser 206 so that the laser can add heat to filament 131 while filament 131 is within filament guide 202. An example of filament guide 202 is provided in co-pending U.S. application Ser. No. 15/827,721, entitled "Filament Guide," filed on Nov. 30, 2017, which is incorporated by reference herein and for the purposes of disclosing how filament guide 202 is made and used in conjunction with the deposition of heated filaments of thermoplastic. The filament guide is attached to mount 201 via support 203.

Roller 204 is a metal wheel with roller bearings on an axle. In order to deposit filament 131, roller 204 is configured to apply a pressing force between i) filament 131, when heated, and ii) a deposition surface, which can be a surface of build plate 111 or a surface of object 151. Roller 204 is attached to mount 201 via body 205, which positions the roller, and is rotatably coupled to body 205 via the axle. In some embodiments of the present invention, body 205 is attached to mount 201 via an intermediate support member.

In accordance with the illustrative embodiment, roller 204 rotates freely on its roller axle and presses filament 131 into previously-deposited filament 151 (i.e., the object being manufactured). Filament 131 is pressed into previously-deposited filament 151 to facilitate adhesion and eliminate voids. The pressing force is generated via the arm of robot 121, as controlled by controller 101.

Laser 206, as a heating device, is a heat source configured to heat filament 131 while the filament is moving through guide 202. Laser 206 is configured to emit electromagnetic radiation in the form of infrared light. In some alternative embodiments of the present invention, the laser emits electromagnetic radiation in a different form, while in some other embodiments laser 206 is instead a heat source other than a laser, or emits thermal energy that which might be in a form other than electromagnetic radiation, or both. Laser 206 is attached to mount 201 via support 207.

The particular source of the heat is sufficient to heat the thermoplastic in a length of filament 131 prior to the length reaching the deposition point, for each such length of filament. When heated in this way by laser 206, the thermoplastic in the filament becomes pliable and adhesive, and can be pressed and deposited by roller 204. The laser is configured to produce a temperature at filament 131 that is high enough to make the thermoplastic pliable and adhesive, but not too high. If the thermoplastic is too cool, it is not sufficiently pliable or adhesive, and if the thermoplastic is too hot, it melts and its viscosity becomes too low.

In some embodiments of the present invention, laser 206 is a Laserline LDM-800 diode laser that heats both a length of a segment of filament 131 and a length of a segment of previously-deposited filament 151 under the control of controller 101. It will be clear to those skilled in the art, after reading this disclosure, how to make alternative embodiments of the present invention that use a different laser.

Filament drive 208 is configured to feed filament 131 at a non-zero feed velocity controlled by controller 101. Drive 208 feeds the filament forward along the longitudinal axis of the filament, in particular toward and through filament guide 202 and other components. The feed velocity is important in regard to design considerations of filament guide 202 as described below, as well as in regard to other reasons. In some embodiments of the present invention, drive 208 is attached to mount 201 via its own support member.

Conduit 209 is configured to provide a predetermined gas from a source of the gas to filament guide 202, in particular to filament 131 within guide 202. In some embodiments of the present invention, the gas that is used has properties enabling it to displace oxygen such that combustion is inhibited when filament 131 is heated by laser 206. For example and without limitation, the predetermined gas can be nitrogen. Conduit 209 is connected to filament guide 202 as described below.

Twisting device 210 comprises a mechanism that is configured to twist filament 131 around the longitudinal axis of the filament. Device 210 twists filament 131 by applying an amount of torque to the filament as needed and under the control of controller 101. Device 210 is capable of twisting filament 131 while the filament is moving toward the deposition point.

In accordance with the illustrative embodiment, twisting device 210 is situated downstream along filament 131 in relation to filament drive 208. In some embodiments in which twisting device 210 is situated downstream, filament drive 208 is capable of swiveling freely such that filament 131 rotates freely around its longitudinal axis while being supplied by drive 208. In some other embodiments of the present invention, twisting device 210 is instead integrated into filament drive 208, wherein a drive mechanism drives filament 131 along the longitudinal axis of the filament while twisting the filament around the longitudinal axis.

When a portion of a segment of filament 131 is twisted by twisting device 210, including its reinforcing fibers, the twisted portion of the filament can then be deposited as an arced portion by deposition head 122, in a manner that mitigates the forces exerted on the fibers as a result of bending them.

In some embodiments of the present invention, when a portion of a segment of filament 131 is twisted by twisting device 210, filament source 130 can rotate accordingly, in order to accommodate the twist that is imparted to filament 131, and while under the control of controller 101. As those who are skilled in the art will appreciate after reading this specification, the amount of rotation of filament source 130 and the timing of the rotations can depend on various considerations. These considerations include i) the amount of rotation of each filament portion, ii) the timing of the rotations of the filament portions, iii) the directions of the rotations of a series of filament portions to be rotated, and iv) the amount of slack maintained in filament 131 between filament source 130 and twisting device 210, for example and without limitation. The total accumulated amount of rotation in any one direction (i.e., counterclockwise or clockwise) of filament source 130 can be minimized, for example, by controller 101 keeping track of the direction of rotation of each filament portion, as described below and in FIG. 6B.

Figure 3:
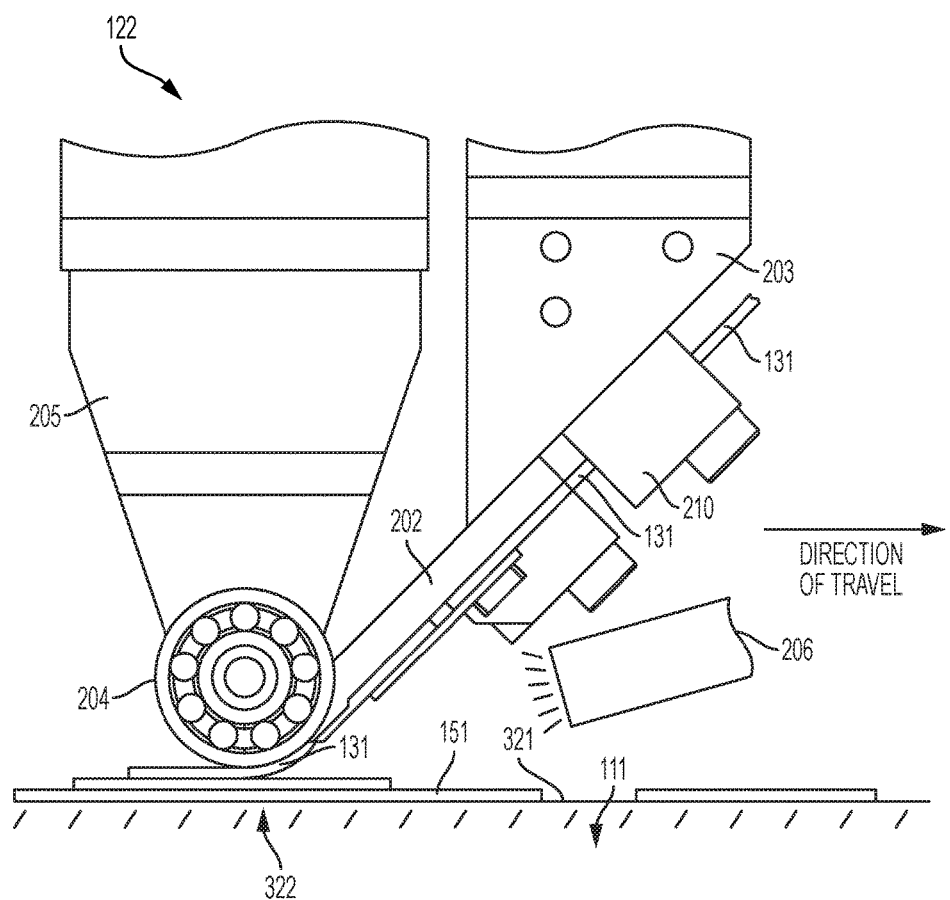
FIG. 3 depicts an illustration of the spatial relationship of the salient components of deposition head 122 to a previously-deposited segment of thermoplastic filament 131.

FIG. 3 depicts an illustration of the spatial relationship of the salient components of deposition head 122 to one or more previously deposited segments of thermoplastic filament 131 that constitute object 151. In accordance with the illustrative embodiment, the salient components of deposition head 122 comprise: filament guide 202, support 203, roller 204, deposition head body 205, laser 206, and twisting device 210.

For the purposes of this specification, deposition point 322, by definition, is always "under" the roller at the point or area of deposition, as opposed to being at a fixed point or area on build plate 111 or object 151. Deposition point 322 is associated with surface 321.

Deposition head 122 is capable of depositing one or more portions of one or more segments of filament 131 in a straight line without twisting the thermoplastic filament and without twisting the reinforcing fiber in the filament around the filament's longitudinal axis. Deposition head 122 deposits portions in a straight line along the direction of travel indicated in FIG. 3, with respect to a fixed point on build plate 111.

Deposition head 122 is also capable of depositing one or more portions of one or more segments of filament 131 according an arc of angle θ in relation to a straight line such as the direction of travel indicated in FIG. 3, whenever it is determined that such a bend is to be introduced, based on a model of object 151 stored and act on by controller 101. In particular, deposition head 122 is capable of depositing one or more portions of one or more segments of thermoplastic filament 131 according to an arc of θ radians and radius R while twisting the thermoplastic filament and the reinforcing fiber φ radians around the longitudinal axis of the filament. For the purposes of this specification and the claims, the term "arc" is defined as "a part of the circumference of a circle of a given radius." As those who are experienced in the art will appreciate after reading this specification, any type of bend can be represented as one or more arc portions, wherein each arc portion i is of $\theta_i$ radians, radius $R_i$, and length $S_i$ along its longitudinal axis.

Deposition head 122 is capable of depositing the aforementioned straight portions and arced portions of one or more segments of filament 131, in any combination of straight and/or arced portions, and in which any combination of portions can be contiguous with respect to one another.

Figure 4:
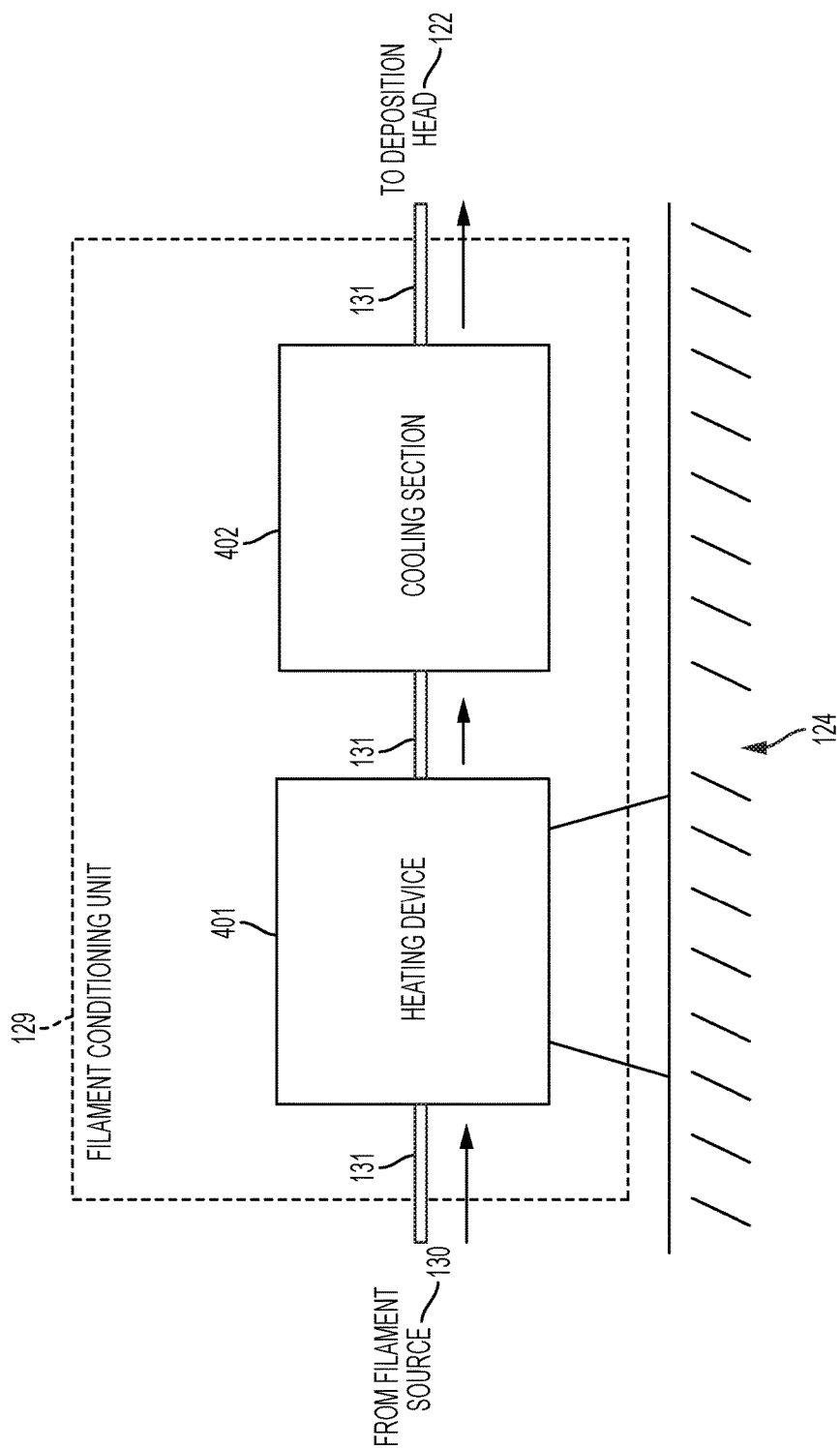
FIG. 4 depicts an illustration of filament conditioning unit 129, which includes heating device 401.

FIG. 4 depicts an illustration of filament conditioning unit 129. Filament conditioning unit 129 comprises: heating device 401 and cooling section 402, interrelated as shown. Filament 131 passes through heating device 401 and cooling section 402, in the direction indicated by the arrow and at a feed velocity determined by filament drive 208. As those who are skilled in the art will appreciate after reading this specification, one or both of the elements that are depicted as being part of filament conditioning unit 129 can instead be attached to or associated with a part of additive manufacturing system 100 different than robot arm segment 124.

When heated by heating device 401 and subsequently cooled by cooling section 402, as described below, the thermoplastic in the filament is annealed as a result, thereby conditioning the thermoplastic that is twisted by twisting device 210.

Heating device 401 is a heat source configured to heat filament 131 in order to condition the filament for twisting. In accordance with the illustrative embodiment, heating device 401 is a laser similar to laser 206 and is configured to emit electromagnetic radiation in the form of infrared light. In some alternative embodiments of the present invention, the heating device emits electromagnetic radiation in a different form, while in some other embodiments the heating device is instead a heat source other than a laser, or emits thermal energy that which might be in a form other than electromagnetic radiation, or both. Heating device 401 is capable of being controlled by controller 101.

Cooling section 402 provides for the necessary cooling of a heated portion of filament 131, as part of the annealing process. In accordance with the illustrative embodiment, cooling section 402 amounts to a sufficient distance that separates heating device 401 and twisting device 210, such that annealing occurs while concurrently managing (e.g., reducing, avoiding, etc.) internal stresses otherwise introduced by the twisting. The separation is sufficient to provide for passive cooling of each heated portion as the filament moves according to its feed velocity. In some embodiments of the present invention, cooling section 402 can be a device that actively cools each heated portion.

The cooling process represented by cooling section 402 is capable of being controlled by controller 101. The controller can provide control, for example, in adjusting the feed velocity in the case of passive cooling or, for example, in directly adjusting the amount of cooling in the case of active cooling.

As part of the annealing process, the particular source of heat in device 401 is sufficient to heat the thermoplastic in a portion of filament 131 prior to the portion being twisted by twisting device 210, for each such portion of filament. The particular source of the heat of heating device 410 is sufficient to heat, at least to the glass transition temperature, Tg, each portion of filament 131 to be twisted, such that the portion is at the appropriate temperature when twisted by twisting device 210. The appropriate temperature is dependent on the particular thermoplastic being used; in some embodiments of the present invention, this temperature is at the annealing temperature as described earlier, while in some other embodiments this temperature is above the annealing temperature.

In some embodiments of the present invention, the amount of heat provided by device 410 can be based on other factors as well. For example and without limitation, the amount of heat is dependent on the angular amount of twist, op.

In any event, the temperature of each heated portion of filament 131 has to be at a point at which torsion forces that would otherwise be introduced by twisting the filament are avoided or, at least, reduced. Heating device 401 is configured to produce a temperature in the thermoplastic of the filament that is higher than the glass transition temperature of the thermoplastic, at least for semi-crystalline polymers, but not so high such that the filament melts and its viscosity becomes too low.

In some embodiments of the present invention, filament conditioning unit 129 heats some or all of filament 131, regardless of whether each particular portion of the filament is to be twisted by twisting device 210 or not.

FIG. 5 depicts a block diagram of the salient components of controller 101. Controller 101 comprises: receiver and transmitter 501, processor 502, and memory 503, which are interconnected as shown. In some embodiments of the present invention, controller 101 is a personal computer, while in some other embodiments controller 101 is a server computer, while in still some other embodiments controller 101 is a different type of computing device that is capable of interfacing with and controlling one or more controllable devices.

Receiver and transmitter 501 enables controller 101 to transmit signals to and receive signals from build chamber 102, turntable 110, robot 121, deposition head 122, and filament conditioning unit 129, including the individual components thereof. It will be clear to those skilled in the art how to make and use receiver and transmitter 501.

Processor 502 is a general-purpose processor that can execute an operating system, as well as the application software that performs the tasks described herein and shown in FIG. 6, and of initializing, using, and managing a database representing build parameters of object 151. It will be clear to those skilled in the art how to make and use processor 502.

Memory 503 is a non-transitory, non-volatile memory that stores:
 i. operating system 511, and
 ii. application software 512, and
 iii. the build-parameters database in database 513, as part of a computer model of object 151.

It will be clear to those skilled in the art how to make and use memory 503.

Figure 6A:
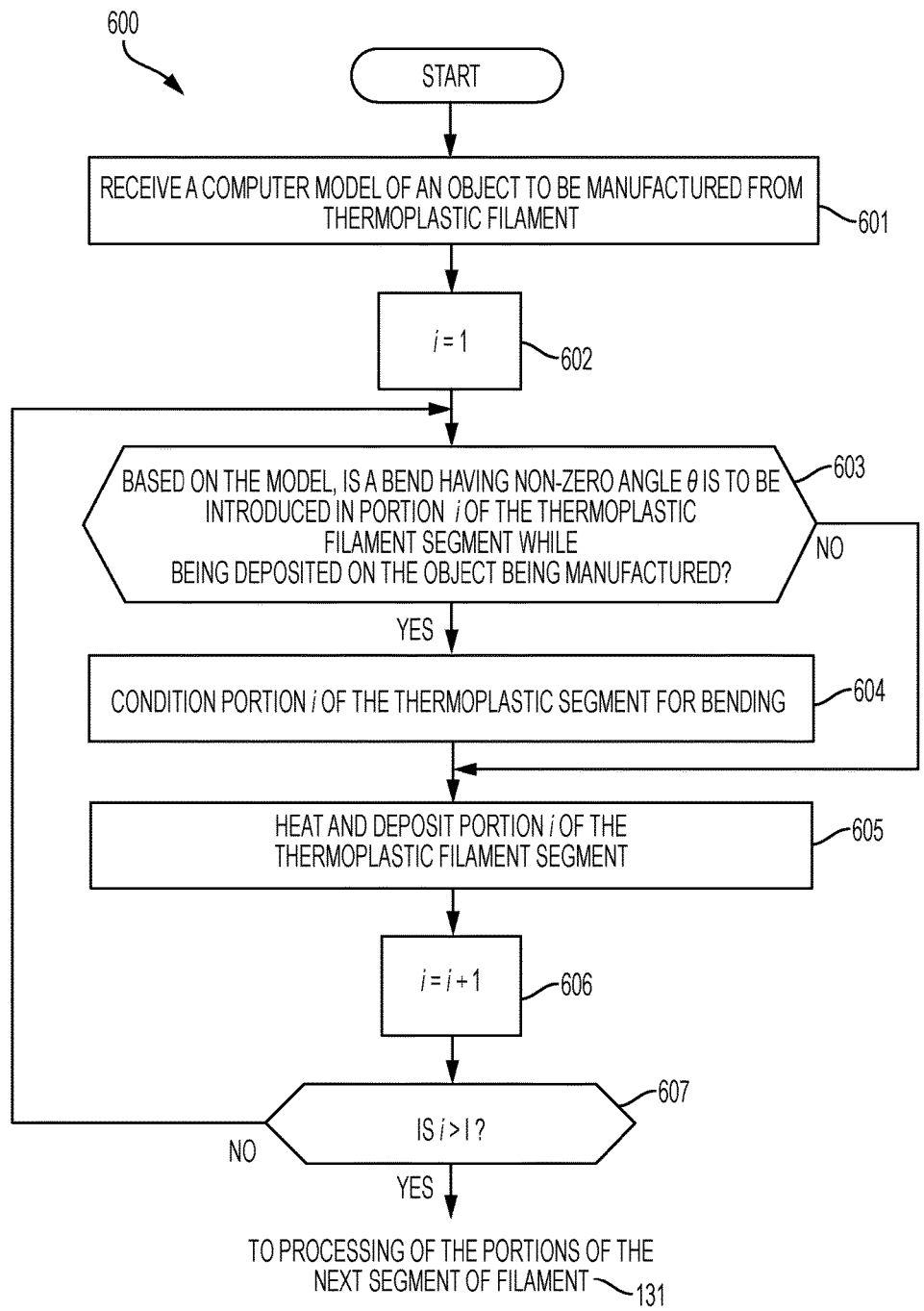
FIG. 6A through 6C depict a flowchart of at least some of the salient processes performed in accordance with the illustrative embodiment of the present invention.
Figure 6B:
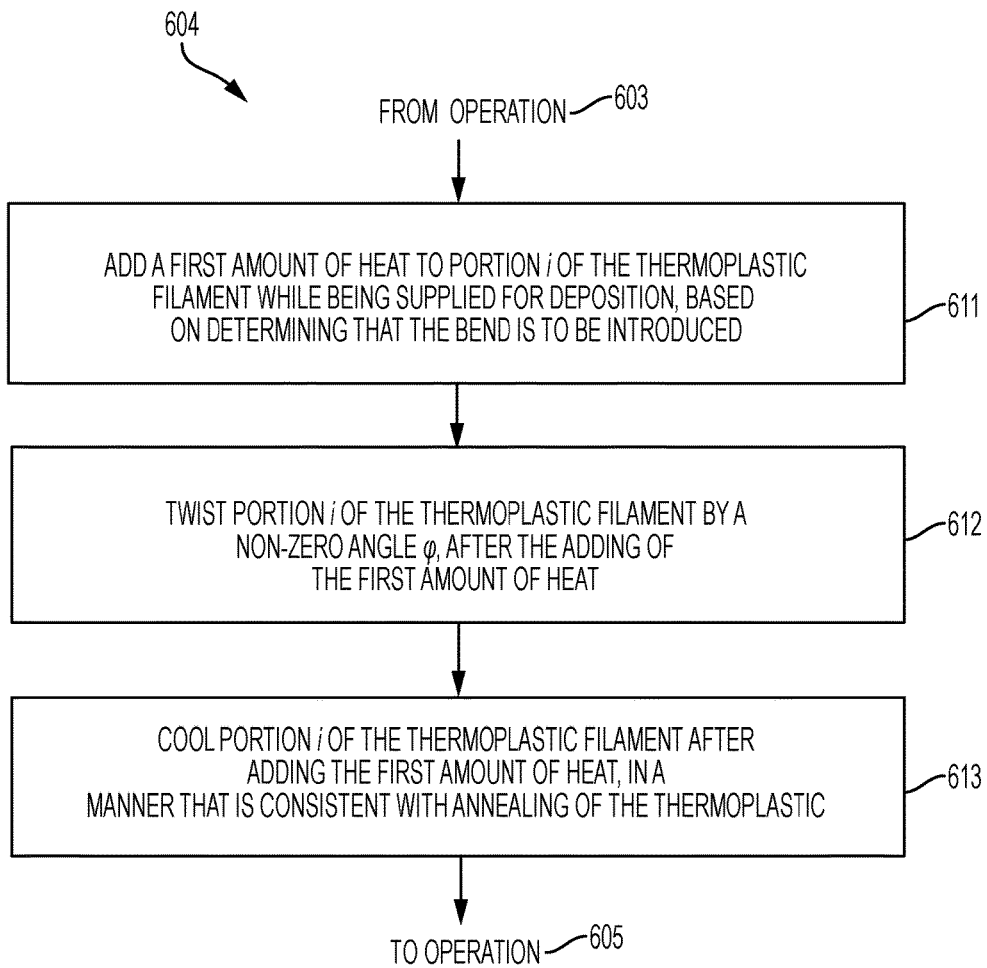
Figure 6C:
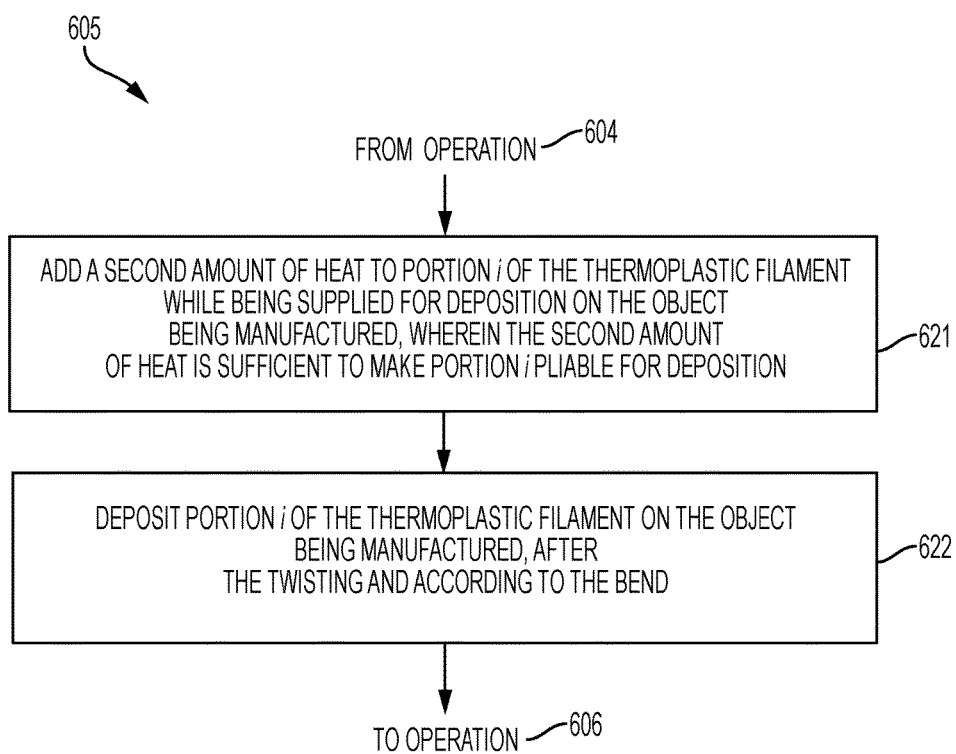

FIGS. 6A through 6C depict a flowchart of at least some of the salient processes performed in accordance with the illustrative embodiment of the present invention. It will be clear to those having ordinary skill in the art, after reading the present disclosure, how to make and use alternative embodiments of method 600, as well as the other methods disclosed in this specification, wherein the recited operations sub-operations, and messages are differently sequenced, grouped, or sub-divided—all within the scope of the present disclosure. It will also be clear to those skilled in the art, after reading the present disclosure, how to make and use alternative embodiments of the disclosed methods wherein some of the described operations, sub-operations, and messages are optional, or are omitted.

Controller 101 either performs each depicted and described operation itself or directs the appropriate component to perform the operation, as described below. As those who are skilled in the art will appreciate after reading the present disclosure, some alternative embodiments of the disclosed operations are performed by components other than those that are described below.

At operation 601 of FIG. 6A, controller 101 receives a computer model of object 151. In some embodiments of the present invention, the computer model is based on the object being manufactured from thermoplastic filament. The computer model is representative of one or more portions of one or more segments of filament 131 being used to manufacture object 151. Controller 101 stores the computer model into memory 503.

The operations that follow are performed for each portion i of a segment of filament 131, beginning with the first portion (i.e., i equal to 1 as initialized in operation 602) of the segment, wherein the segment consists of I portions. As those who are skilled in the art will appreciate after reading this specification, the operations described below can be repeated for each successive segment of filament 131.

In some embodiments of the present invention, each portion i can be regarded as having a "downstream" portion and an "upstream" portion. The twisting of filament 131 at twisting device 210 of deposition head 122 described below creates torsional forces on both the "downstream" portion of the filament (i.e., the length of filament between the deposition head 122 and point of deposition 322) and on the "upstream" portion of the filament (i.e., the length of filament between deposition head 122 and spool of filament 130). In order to alleviate the torsional forces on the upstream portion of filament 131, the upstream portion can be heated above the glass transition temperature Tg of the thermoplastic, as described below, which allows the thermoplastic molecules to realign themselves in response to the torsional force. This is akin to annealing.

At operation 603, controller 101 determines, based on the stored computer model, whether a bend (or curve) having non-zero angle θ is to be introduced in portion i of thermoplastic filament 131 while being deposited on object 151, wherein the portion has a first end and a second end. In some embodiments of the present invention, the first end of portion i is defined as where the filament is to begin to deviate from a straight line in accordance with the bend (i.e., where the bend begins), and angle θ is measured from the first end. In some embodiments of the present invention, the second end of portion i is defined as where the bend ends (i.e., on the other end from where the bend begins). In some embodiments of the present invention, a bend having non-zero angle θ that is to be introduced in portion i is in the form of an arc.

If the bend having non-zero angle θ is to be introduced in portion i of thermoplastic filament 131, then control of execution proceeds to operation 604 for conditioning of portion i for bending. Otherwise, portion i to be deposited as a straight portion, and control of execution proceeds to operation 605.

In some embodiments of the present invention, control of execution proceeds to operation 604 based on angle θ exceeding a threshold that is a predetermined value greater than zero (e.g., π/36 radians, π/18 radians, π/6 radians, etc.), wherein control of execution otherwise proceeds to operation 605. In such embodiments, it might be determined, for example, that the conditioning that is performed in operation 604 is unnecessary for small bends. The threshold can be selected based on the thermoplastic filament being used or the object being manufactured, or both, for example and without limitation.

Operation 604 is depicted in FIG. 6B. At operation 611, controller 101 directs heating device 401 to add a first amount of heat to portion i of thermoplastic filament 131 while being supplied for deposition, based on determining that the bend is to be introduced in said portion. The adding of the first amount of heat is described above and in regard to FIG. 4.

At operation 612, controller directs twisting device 210 to twist portion i of the thermoplastic filament by a non-zero angle φ, after the adding of the first amount of heat in accordance with operation 611. The amount of twist φ is described below and in regard to FIGS. 7 through 10.

As those who are skilled in the art will appreciate after reading this specification, controller 101 can direct twisting device 210 to twist portion i either clockwise or counter-clockwise, depending on one or more considerations. Portion i can be twisted in a particular direction that is based on, for example and without limitation, one or more of:

i. the direction of the curve to be applied to portion i, as indicated in the computer model of object 151, and
ii. the direction(s) of the curves of one or more previous portions, as indicated in the computer model of object 151, and
iii. the direction of the twist that was applied to the preceding portion, or the direction(s) of the twists of one or more previous portions, and
iv. the direction(s) of the curves to be applied to one or more portions after portion i, as indicated in the computer model of object 151, and
v. random choice.

At operation 613, portion i is cooled along cooling section 402, in a manner that is consistent with annealing of the thermoplastic. In some embodiments of the present invention, controller 101 controls the cooling process, as described above and in regard to FIG. 4.

Control of execution proceeds to operation 605, which is depicted in FIG. 6C. At operation 621, controller 101 directs laser 206 to add a second amount of heat to portion i of thermoplastic filament 131 after twisting and/or cooling of the portion, wherein the second amount of heat is sufficient make the portion pliable for deposition as discussed above and in regard to FIG. 2.

At operation 622, controller 101 directs deposition head 122 to deposit portion i of thermoplastic filament 131 on object 151, after the reheating that is performed at operation 621. The deposition head moves in relation to object 151 and according to the bend (e.g., curve to the left, curve to the right, etc.), and deposits portion i according to the movement of the deposition head.

Control of execution proceeds to operation 606, in which portion counter i is incremented. At operation 607, controller 101 determines whether the I filament portions of the current segment have been processed. If all of the filament portions have not yet been processed, control of execution proceeds back to operation 603 in order to process the next filament portion. Otherwise, control of execution proceeds to the processing of the portions of the next segment of filament.

Controller 101 and the controlled components repeat operations 603 and higher, for the next contiguous portion of thermoplastic filament 131 and subsequent portions on the current segment, and for all portions on all subsequent segments after that. Multiple, contiguous portions of thermoplastic filament are depicted in FIGS. 7 through 10, which illustrate some examples of combinations of filament portions that make up a filament segment. As those who are skilled in the art will appreciate after reading this specification, other combinations of portions of thermoplastic filament are possible, in addition to those that are depicted and described below.

Figure 7:
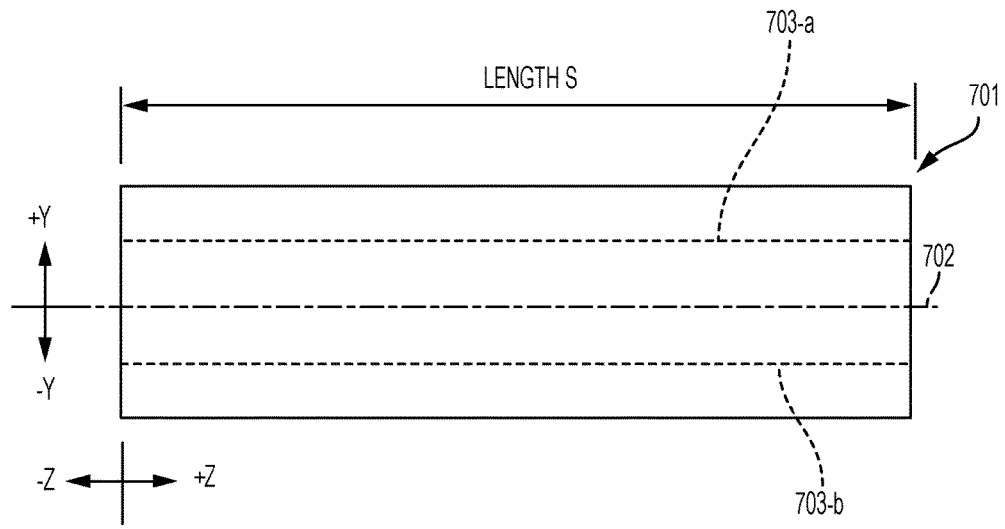
FIG. 7 depicts a side view of segment 701 of thermoplastic filament 131.

FIG. 7 depicts a side view of segment 701 of thermoplastic filament 131. Filament segment 701 is has a longitudinal axis L, denoted by axis 702 in the figure, and is of length S as measured along longitudinal axis 702. Segment 701 comprises reinforcing fibers (e.g., carbon fibers, etc.), including reinforcing fibers 703-a and 703-b whose relative positions within segment 701 are superimposed on the segment as dotted lines. Fibers 703-a and 703-b are substantially parallel to longitudinal axis 702. As described earlier, filament 131 can comprise thousands of fibers, of which fibers 703-a and 703-b are but two of those fibers. For clarity purposes, each of fibers 703-a and 703-b is depicted as being situated midway between longitudinal axis 702 and the lateral surface of segment 701.

Figure 8:
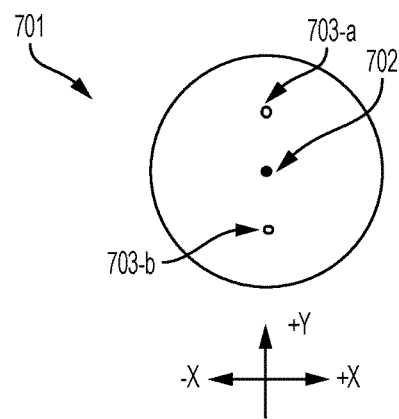
FIG. 8 depicts a cross sectional view of segment 701 of thermoplastic filament 131 in relation to longitudinal axis 702.

FIG. 8 depicts a cross sectional view of segment 701 of thermoplastic filament 131 in relation to longitudinal axis 702. Spatial relationships of the cross section of segment 701 in FIG. 8 to the side view in FIG. 7 are represented by the x, y, and z coordinate notations in the two figures. For clarity purposes, longitudinal axis 702, fiber 703-a, and fiber 703-b are depicted as being aligned with one another along the same axis (the y-axis).

Figure 9:
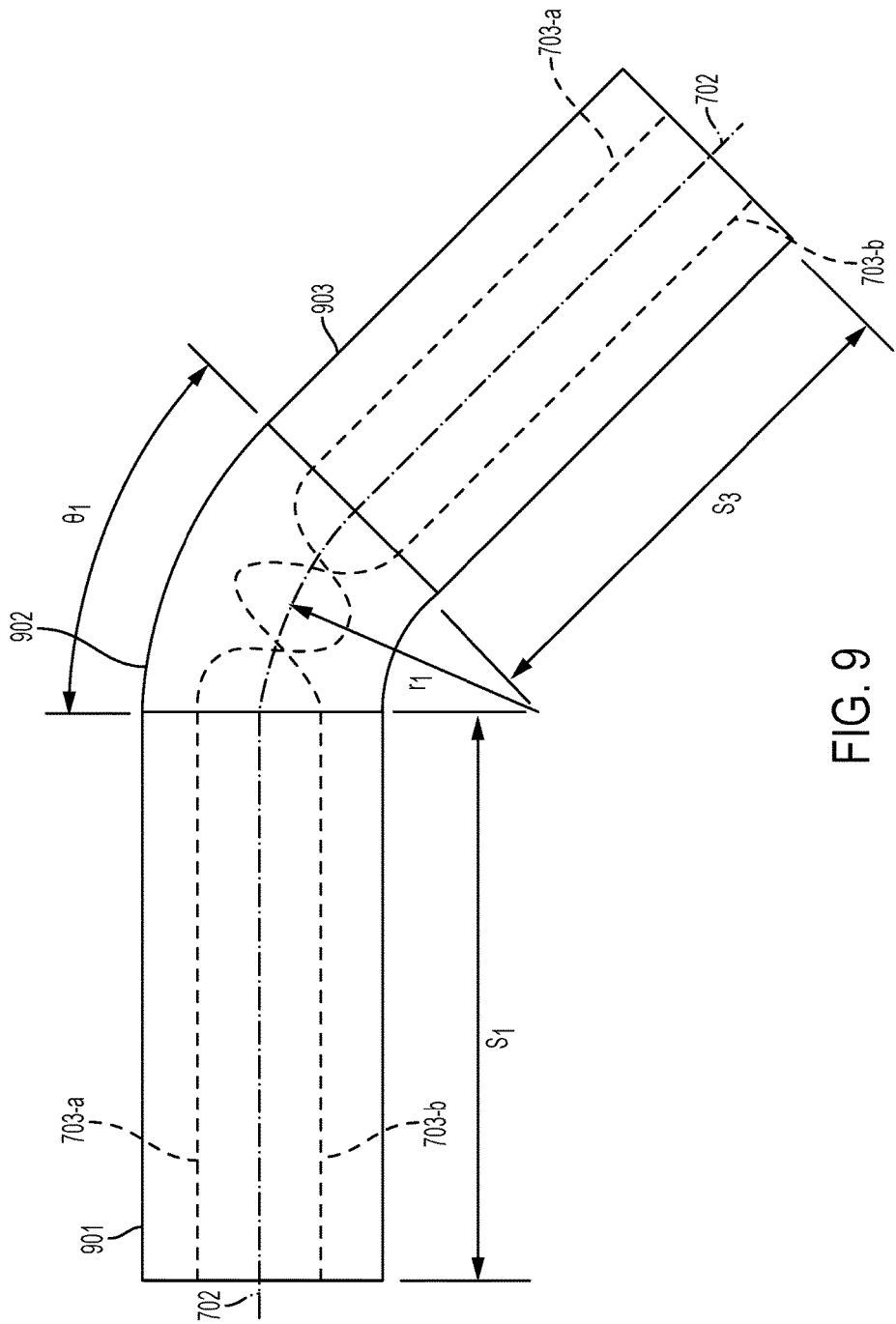
FIG. 9 depicts a first portion, a second portion, and a third portion of segment 701 of filament 131.

FIG. 9 depicts a first portion, a second portion, and a third portion of segment 701 of filament 131, which are denoted as portion 901, portion 902, and portion 903, respectively. Portions 901, 902, and 903 have lengths $S_1$, $S_2$, and $S_3$, respectively (e.g., as measured along axis 702, etc.). One or more of lengths $S_1$, $S_2$, and $S_3$ can be different from one another, as those who are skilled in the art will appreciate after reading this specification. In general, portions 901 through 903 are deposited according to system 100 and method 600 disclosed herein.

Deposition head 122, while under the control of controller 101, deposits straight portion 901 of segment 701 of thermoplastic filament 131 in a straight line without twisting filament 131 or the reinforcing fibers 703-a and 703-b around longitudinal axis 702.

Deposition head 122 deposits arced portion 902 of segment 701 of thermoplastic filament 131 in an arc of $θ_1$ radians and radius $R_1$ while twisting filament 131 and the reinforcing fibers 703-a and 703-b by the amount of $φ_1$ radians around longitudinal axis 702. Portions 901 and 902 are contiguous with respect to each other. In some embodiments of the present invention, $$0 < θ_1 \le \frac{π}{2} \text{ and } φ_1 = 2πN_1,$$

where $N_1$ is a non-zero $S_2$ integer. In some embodiments of the present invention, each of reinforcing fibers 703-a and 703-b in thermoplastic filament 131 in portion 902 forms a helix around a curved portion of the longitudinal axis 702 with a rate of twist of $$\frac{dφ_1}{dS_2} \ne 0$$

such that $$\frac{d^2\varphi_1}{dS_2^2} = 0.$$

The rationale behind twisting the filament by the amount of $\varphi_1=2\pi N_1$, where $N_1$ is a non-zero integer, is based on the goal of exposing evenly all of the fibers in the filament to all of the different forces—namely, compressive and tensile—that are applied as a result of bending the portion of filament. For example, this can be accomplished by twisting the filament by $2\pi$ radians, which is equal to one complete rotation of filament 131. The rational behind maintaining a constant rate of twist—namely, maintaining $$\frac{d^2\varphi_1}{dS_2^2} = 0$$

—furthers the aforementioned goal of exposing evenly all of the fibers to the applied forces that are related to bending the filament.

In some embodiments of the present invention, if $\theta_1$ in arced portion 902 exceeds a predetermined amount (e.g., $\pi/2$ radians, etc.), controller 101 treats the arced portion as two or more arced sub-portions. The sub-portions are identified such that the value for $\theta$ of each arc sub-portion does not exceed the predetermined amount, and the amount of twist that is applied to each arced sub-position is equal to $2\pi N$, where N is a non-zero integer.

In some alternative embodiments of the present invention, and as described earlier, deposition head 122 twists filament 131 and the reinforcing fibers 703-*a* and 703-*b*, only if angle $\theta$ exceeds a threshold that is a predetermined value greater than zero (e.g., $\pi/36$ radians, $\pi/18$ radians, $\pi/6$ radians, etc.). In some alternative embodiments of the present invention, deposition head 122 twists filament 131 and the reinforcing fibers 703-*a* and 703-*b*, only if the length of the arced portion exceeds a predetermined, non-zero threshold.

Deposition head 122 deposits straight portion 903 of segment 701 of thermoplastic filament 131 in a straight line without twisting filament 131 or the reinforcing fibers 703-*a* and 703-*b* around longitudinal axis 702. Portions 902 and 903 are contiguous with respect to each other.

Figure 10:
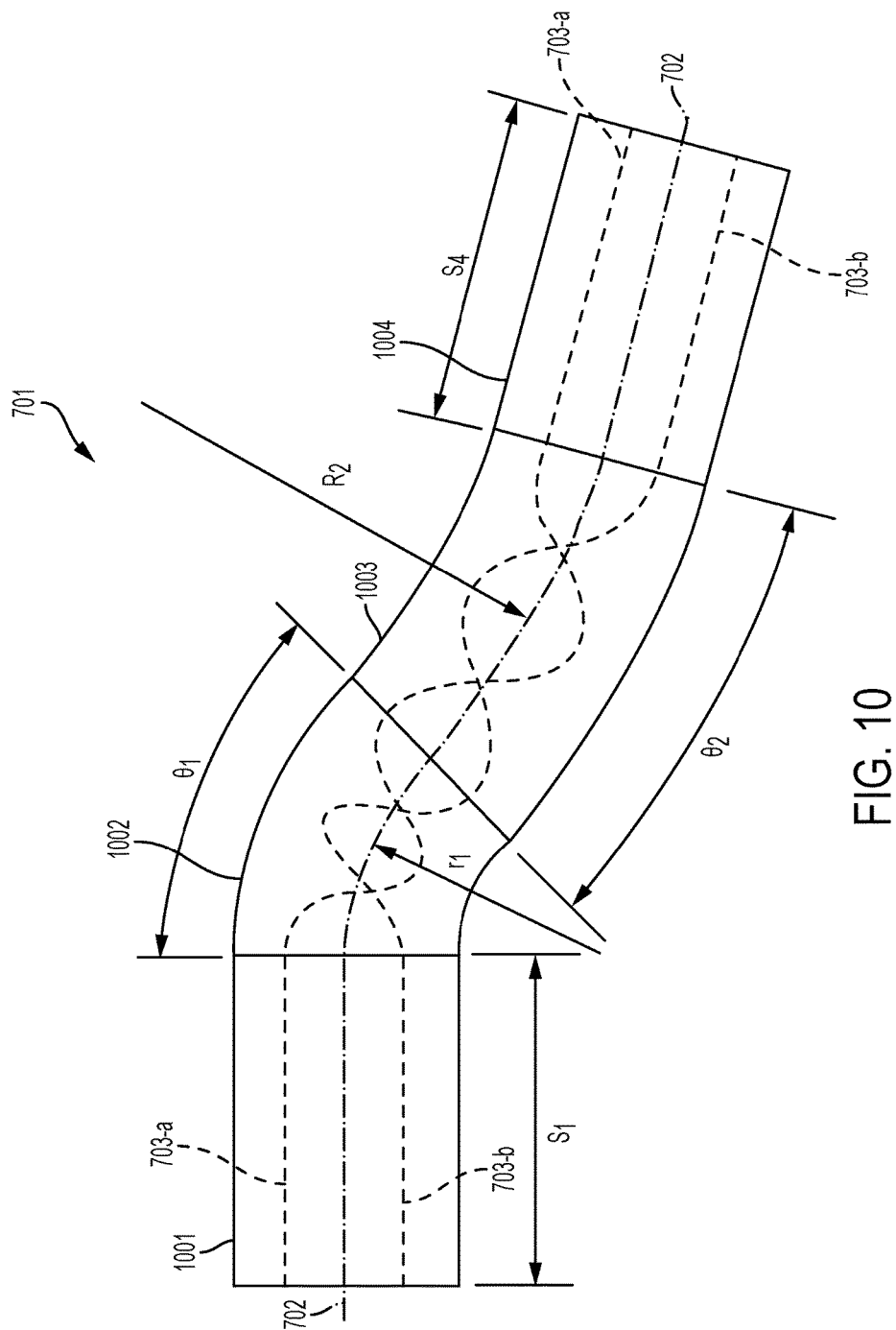
FIG. 10 depicts a first straight portion, a first arced portion, a second arced portion, and a second straight portion of segment 701 of filament 131.

FIG. 10 depicts a first straight portion, a first arced portion, a second arced portion, and a second straight portion of segment 701 of filament 131, which are denoted as portion 1001, portion 1002, portion 1003, and portion 1004 respectively. Portions 1001, 1002, 1003, and 1004 have lengths $S_1$, $S_2$, $S_3$, and $S_4$, respectively (e.g., as measured along axis 702, etc.). One or more of lengths $S_1$, $S_2$, $S_3$, and $S_4$ can be different from one another, as those who are skilled in the art will appreciate after reading this specification. In general, portions 1001 through 1004 are deposited according to system 100 and method 600 disclosed herein.

Deposition head 122, while under the control of controller 101, deposits portion 1001 of segment 701 of thermoplastic filament 131 in a straight line without twisting filament 131 or the reinforcing fibers 703-*a* and 703-*b* around longitudinal axis 702.

Deposition head 122 deposits portion 1002 of segment 701 of thermoplastic filament 131 in an arc of $\theta_1$ radians and radius $R_1$ while twisting filament 131 and the reinforcing fibers 703-*a* and 703-*b* by the amount of $\varphi_1$ radians around longitudinal axis 702. Portions 1001 and 1002 are contiguous with respect to each other. In some embodiments of the present invention, $$0 < \theta_1 \leq \frac{\pi}{2}$$

and $\varphi_1=2\pi N_1$, where $N_1$ is a non-zero integer. In some embodiments of the present invention, each of reinforcing fibers 703-*a* and 703-*b* in thermoplastic filament 131 in portion 1002 forms a helix around a curved portion of the longitudinal axis 702 with a rate of twist of $$\frac{d\varphi_1}{dS_2} \neq 0$$

such that $$\frac{d^2\varphi_1}{dS_2^2} = 0.$$

Deposition head 122 deposits portion 1003 of segment 701 of thermoplastic filament 131 in a second arc of $\theta_2$ radians and radius $R_2$ while twisting the thermoplastic filament and the reinforcing fibers 703-*a* and 703-*b* by the amount of $\varphi_2$ radians around longitudinal axis 702. Portions 1002 and 1003 are contiguous with respect to each other. In some embodiments of the present invention, $$0 < \theta_2 \leq \frac{\pi}{2}$$

and, $\varphi_2=2\pi N_2$, where $N_2$ is a non-zero integer.

As those are skilled in the art will appreciate after reading this specification, $\theta_1$ and $\theta_2$ can be either equal to or not equal to each other; $R_1$ and $R_2$ can be either equal to or not equal to each other; $R_1\theta_1$ and $R_2\theta_2$ can be either equal to or not equal to each other; and $N_1$ and $N_2$ can be either equal to or not equal to each other. In some embodiments of the present invention, each of reinforcing fibers 703-*a* and 703-*b* in portion 1003 forms a helix around a curved portion of the longitudinal axis 702 with a rate of twist of $$\frac{d\varphi_1}{dS_3} \neq 0$$

such that $$\frac{d^2\varphi_1}{dS_3^2} = 0.$$

As depicted in FIG. 10, arced portion 1002 curves to the right and arced portion 1003 curves to the left. As those who are skilled in the art will appreciate after reading this specification, two contiguous arced portions alternatively can both curve in the same direction, with similar treatment to that described above and for arced portions 1002 and 1003

(i.e., twisting being administered on a per-arc basis). In some alternative embodiments of the present invention, however, controller 101 can treat two contiguous arced portions both curving in same direction as a single, combined arced portion of length $S_1+S_2$, based on a relationship between radius $R_1$ of the first arced portion and radius $R_2$ of the second arced portion. For example, if values for $R_1$ and $R_2$ are less than a predetermined difference, controller 101 can treat the two contiguous, arced portions as a combined arced portion, in that deposition head 122 twists filament 131 and the reinforcing fibers 703-a and 703-b by the amount $\varphi_1 = 2\pi N$ across the combined arc, where N is a non-zero integer.

Deposition head 122 deposits portion 1004 of segment 701 of thermoplastic filament 131 in a straight line without twisting filament 131 or the reinforcing fibers 703-a and 703-b around longitudinal axis 702. Portions 1003 and 1004 are contiguous with respect to each other.

In some embodiments of the present invention, a twisting of a portion of a segment of filament 131 (e.g., arced portion 902, arced portion 1002, arced portion 1003, etc.) has the effect of causing enlargement in the thermoplastic toward the lateral surface of the portion. This is because the length of the reinforcing fibers, including fibers 703-a and 703-b, remain constant while they are twisted, resulting in the ends of the filament portion along its longitudinal axis 702 moving towards each other and thus causing the thermoplastic in the portion to move laterally outward.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method of depositing a portion of a segment of fiber-reinforced thermoplastic filament that comprises a longitudinal axis L, the method comprising:

imparting a torsional force to the portion of the segment of fiber-reinforced thermoplastic filament;

heating the portion of the segment of fiber-reinforced thermoplastic filament above a glass transition temperature $T_g$ of thermoplastic in the filament to alleviate the torsional force;

cooling the portion of the segment of fiber-reinforced thermoplastic filament from above the glass transition temperature $T_g$ of the thermoplastic to below the glass transition temperature $T_g$ of the thermoplastic; and re-heating the portion of the segment of fiber-reinforced thermoplastic filament above the glass transition temperature $T_g$ of the thermoplastic and depositing the portion of the segment of fiber-reinforced thermoplastic filament in a first arc of $\theta_1$ radians and radius $R_1$ while twisting the portion of the segment of fiber-reinforced thermoplastic filament $\varphi_1$ radians around the longitudinal axis L;

wherein $T_g$ and $R_1$ are positive real numbers, and wherein $\theta_1$ and $\varphi_1$ are real numbers.

2. The method of claim 1 wherein the task of cooling the portion of the segment of fiber-reinforced thermoplastic filament is consistent with annealing of the thermoplastic.

3. The method of claim 1 wherein the task of heating the portion of the segment of fiber-reinforced thermoplastic filament comprises adding a first amount of heat to the portion, wherein the first amount of heat is dependent on the glass transition temperature $T_g$ and on twist angle $\varphi$.

4. A method for additive manufacturing of an object, the method comprising:

receiving, by a controller, a model of the object, wherein the model is based on the object being manufactured from thermoplastic filament;

determining, by the controller and based on the model, that a bend having non-zero angle $\theta$ is to be introduced in a downstream portion of a thermoplastic filament while being deposited on the object being manufactured, wherein a first end of the downstream portion is defined as where the filament is to begin to deviate from a straight line in accordance with the bend, wherein angle $\theta$ is measured from the first end, and wherein the thermoplastic filament comprises a longitudinal axis L;

adding, by a first heat source, a first amount of heat to an upstream portion of the thermoplastic filament while being supplied for deposition, based on determining that the bend is to be introduced;

twisting, by a twisting device, the upstream and downstream portions of the thermoplastic filament by a non-zero angle $\varphi$ around the longitudinal axis L, after the first amount of heat is added; and depositing, by a deposition head, the downstream portion of the thermoplastic filament on the object being manufactured, after the twisting of the downstream portion of the thermoplastic filament occurs and in accordance with the bend.

5. The method of claim 4 wherein the first amount of heat is dependent on the glass transition temperature $T_g$ of thermoplastic in the filament.

6. The method of claim 5 wherein the first amount of heat is sufficient to ensure that the temperature of the upstream portion of the thermoplastic filament when the twisting occurs is above the glass transition temperature $T_g$ of the thermoplastic.

7. The method of claim 4 wherein the first amount of heat is dependent on twist angle $\varphi$.

8. The method of claim 4 further comprising cooling the upstream portion of the filament in a manner that is consistent with annealing of thermoplastic in the filament, wherein the cooling is provided by a separation in distance along the thermoplastic filament of the first heat source and the twisting device.

9. The method of claim 4 further comprising adding, by a second heat source, a second amount of heat to the downstream portion of the thermoplastic filament while being supplied for deposition on the object being manufactured, wherein the second amount of heat is sufficient make the downstream portion pliable for deposition.

10. The method of claim 4 wherein the depositing is achieved by a roller configured to press the thermoplastic filament on the object being manufactured and in accordance with the bend.

11. The method of claim 4 wherein the thermoplastic filament comprises a plurality of fibers.

12. The method of claim 4 wherein $\varphi$ is $2\pi$ radians.

13. A method for additive manufacturing of an object, the method comprising:

adding, by a first heat source, a first amount of heat to an upstream portion of thermoplastic filament while being supplied for deposition on an object being manufactured from the thermoplastic filament, wherein the adding of the first amount of heat is based on whether a bend is to be introduced in a downstream portion of the thermoplastic filament, wherein a first end of the downstream portion is defined as where the filament is to begin to deviate from a straight line in accordance with the bend that is to be introduced into the downstream portion, wherein the bend has a non-zero angle θ as measured from the first end, and wherein the thermoplastic filament comprises a longitudinal axis L;

twisting, by a twisting device, the upstream and downstream portions of the thermoplastic filament by a non-zero angle φ around the longitudinal axis L, after the first amount of heat is added;

adding, by a second heat source, a second amount of heat to the downstream portion of the thermoplastic filament while being supplied for deposition on the object being manufactured, wherein the second amount of heat is sufficient make the downstream portion pliable for deposition; and depositing, by a deposition head, the downstream portion of the thermoplastic filament on the object being manufactured, after the adding of second amount of heat occurs and in accordance with the bend.

14. The method of claim 13 wherein the first amount of heat is dependent on the glass transition temperature $T_g$ of thermoplastic in the filament.

15. The method of claim 14 wherein the first amount of heat is sufficient to ensure that the temperature of the upstream portion of the thermoplastic filament when the twisting occurs is above the glass transition temperature $T_g$ of the thermoplastic.

16. The method of claim 13 wherein the first amount of heat is dependent on twist angle φ.

17. The method of claim 13 further comprising cooling the upstream portion of the filament in a manner that is consistent with annealing of thermoplastic in the filament, wherein the cooling is provided by a separation in distance along the thermoplastic filament of the first heat source and the twisting device.

18. The method of claim 13 wherein the depositing is achieved by a roller configured to press the thermoplastic filament on the object being manufactured and in accordance with the bend.

19. The method of claim 13 wherein the thermoplastic filament comprises a plurality of fibers.

20. The method of claim 13 wherein φ is 2π radians.

* * * * *